US008723444B2

(12) United States Patent
Pansier

(10) Patent No.: US 8,723,444 B2
(45) Date of Patent: May 13, 2014

(54) ELECTRICAL LOAD DRIVING CIRCUIT

(75) Inventor: Frans Pansier, Nuenen (NL)

(73) Assignee: NXP B.V., Eindhoven (NL)

( * ) Notice: Subject to any disclaimer, the term of this patent is extended or adjusted under 35 U.S.C. 154(b) by 182 days.

(21) Appl. No.: 13/402,199

(22) Filed: Feb. 22, 2012

(65) Prior Publication Data

US 2012/0217898 A1 Aug. 30, 2012

(30) Foreign Application Priority Data

Feb. 28, 2011 (EP) .................................... 11250224

(51) Int. Cl.
*H05B 37/02* (2006.01)
*H02J 3/00* (2006.01)

(52) U.S. Cl.
USPC ................................ 315/297; 307/17; 363/16

(58) Field of Classification Search
None
See application file for complete search history.

(56) References Cited

U.S. PATENT DOCUMENTS

| | | | | |
|---|---|---|---|---|
| 4,525,774 | A * | 6/1985 | Kino et al. | 363/17 |
| 5,991,167 | A * | 11/1999 | Van Lerberghe | 363/16 |
| 6,304,461 | B1 * | 10/2001 | Walker | 363/17 |
| 6,344,979 | B1 | 2/2002 | Huang et al. | |
| 6,490,175 | B2 * | 12/2002 | Raets et al. | 363/17 |
| 6,721,191 | B2 | 4/2004 | Duerbaum et al. | |
| 6,822,881 | B2 | 11/2004 | Elferich | |
| 6,829,151 | B2 * | 12/2004 | Elferich et al. | 363/17 |
| 7,629,781 | B2 * | 12/2009 | Kyono | 323/267 |
| 8,189,355 | B2 * | 5/2012 | Kyono | 363/70 |
| 2008/0265670 | A1 | 10/2008 | Pansier | |
| 2010/0194199 | A1 | 8/2010 | Kimura et al. | |
| 2011/0280050 | A1 | 11/2011 | Smeets et al. | |

FOREIGN PATENT DOCUMENTS

| | | | |
|---|---|---|---|
| CN | 1368787 | A | 1/2002 |
| CN | 101110551 | A | 1/2008 |
| EP | 2 365 623 | A1 | 9/2011 |
| WO | 2006/013500 | A1 | 2/2006 |

OTHER PUBLICATIONS

Extended European Search Report for EP Patent Appln. No. 11250224.0 (Jan. 25, 2012)xxx.

* cited by examiner

*Primary Examiner* — Crystal L Hammond

(57) ABSTRACT

Circuits and methods for driving electrical loads, where each is driven according to a desired current. A circuit comprising a switch mode converter comprising a transformer with primary and secondary windings, the primary connected to a voltage supply via one or more input control switches; output circuits, each comprising a switch connecting a load to an output of the secondary, each load series connected with a respective switch and in parallel with a capacitor; and a switching control circuit for control of each of the output circuit switches and for sensing a current through the loads. The switching control circuit operates the output circuit switches to maintain set current through the loads, the switching control circuit configured in successive output cycles of the switch mode converter to operate each output circuit switch in an order dependent on a forward voltage of each of the respective loads.

15 Claims, 5 Drawing Sheets

ELECTRICAL LOAD DRIVING CIRCUIT

CROSS-REFERENCE TO RELATED APPLICATIONS

This application claims the priority under 35 U.S.C. §119 of European patent application no. 11250224.0, filed on Feb. 28, 2011, the contents of which are incorporated by reference herein.

The disclosure relates to circuits for driving a plurality of electrical loads and to methods for operating such circuits, where each electrical load is driven according to a desired current.

Electrical loads incorporating semiconductor devices such as light emitting diodes (LEDs), require a forward voltage in order to conduct and operate as an electrical load. Above this forward voltage, the current passing through such a device can rise rapidly, and is therefore generally limited by the use of additional current control means such as a resistor. The forward voltage of such devices may not be precisely fixed, and may vary considerably over a wide range. The forward voltage of typical LEDs may for example vary by up to ±40% around a nominal value. This variability can make driving such devices problematic in some situations, particularly when a high driving efficiency is desired.

Certain applications where LEDs are used, for example in backlights for image displays such as televisions and computer monitors, require multiple strings of LEDs, where each string comprises a plurality of LEDs connected in series. To drive such multiple strings, a simple parallel connection is undesirable because the forward driving voltage of each string will not be the same in each case. Each string therefore requires its own current control, in order to ensure that the same power is being provided.

Current solutions for multiple output LED driver circuits may incorporate a two stage approach. A first stage delivers an output voltage, which may be dynamically adjusted for optimum efficiency, while a second stage provides the required current control. A problem with this approach is that LED strings need to be current driven. As the forward voltage of LEDs can vary by large amounts, the output voltage of the first stage would need to be at least equal to the voltage of the string with the highest total forward voltage. To assure that each string nevertheless receives the right current, most often the LED strings are driven by a current source connected to the output of the first stage. The voltage drop across the current source is the difference between the output voltage of the first stage (which is determined by the highest forward voltage of any of the connected LED strings) and the forward voltage of the string that is controlled by the current source. This voltage drop can be considerable, and may be up to 10V for a nominal 60V string. This results in significant losses in that current source, thereby reducing the efficiency of operation of the driving circuit.

In alternative approaches the second stage may comprise individual switched mode power stages, for example in the form of buck converters, in order to accommodate for the voltage of each individual LED string. In this way the total losses can be reduced, but at the expense of a considerable higher cost in terms of the bill of materials used and in terms of circuit board area.

It is an object of the invention to address one or more of the above mentioned problems.

The listing or discussion of a prior-published document in this specification should not necessarily be taken as an acknowledgement that the document is part of the state of the art or is common general knowledge.

In accordance with a first aspect of the invention there is provided a circuit for driving a plurality of electrical loads, comprising:

- a switch mode converter comprising a transformer with primary and secondary windings, the primary winding connected to a voltage supply via one or more input control switches;
- a plurality of output circuits, each output circuit comprising an electrical load connected to an output of the secondary winding by a respective output circuit switch and connected in parallel with a capacitor; and
- a switching control circuit connected for control of each of the output circuit switches and for sensing of a current through each of the electrical loads,
- wherein the switching control circuit is configured to operate the output circuit switches to maintain a set current through each of the electrical loads, the switching control circuit configured in successive output cycles of the switch mode converter to operate each of the output circuit switches in an order dependent on a forward voltage of each of the respective electrical loads.

The invention addresses the aforementioned problems by changing the behaviour of a multi-output resonant converter such that each individual output acts as a current source without the disadvantage of a voltage drop normally associated with a physical current source, because the variations in forward voltages of each semiconductor electrical load can be accounted for by the order in which the output circuit switches are operated.

The switching control circuit may be configured to operate a first one of the switches connected to a first one of the electrical loads having a highest forward voltage before a second one of the switches connected to a second one of the electrical loads having a next highest forward voltage. Third and subsequent ones of the switches connected to a third and subsequent ones of the electrical loads having successively lower forward voltages may be switched in successive order after operation of the second one of the switches.

Each electrical load may comprise a plurality of series-connected light emitting diodes.

Each switch may be connected to a respective output of the secondary winding by an inductor. An advantage of such an arrangement is that the conduction time of each switch is augmented, thereby reducing the RMS current through each electrical load considerably.

Each electrical load may be connected in series with a current sensing resistor, the switching control circuit being configured to measure a voltage across each current sensing resistor to determine a current through each respective electrical load. Other current sensing means may alternatively be used by the switching control circuit to sense a current through each electrical load, an example being a Hall sensor.

The switching control circuit may be configured to determine the order of forward voltages of each of the respective electrical loads by measuring a current through each electrical load after closing the switches. The switching control circuit may be configured to store the order of forward voltages of each of the respective electrical loads.

The circuit may be configured to drive more than one set of electrical loads, where the plurality of output circuits is a first plurality of output circuits and the secondary winding is a first secondary winding, the circuit further comprising a second plurality of output circuits each comprising a switch connecting one of the second plurality of electrical loads to an output of a second secondary winding of the transformer, each of the second plurality of electrical loads being connected in series with a respective switch and in parallel with a capacitor, the switching control circuit being further connected for control of each of the second plurality of output circuit switches and for sensing of a current through each of the second plurality of electrical loads, wherein the switching control circuit is configured to operate the second plurality of output circuit switches to maintain a set current through each of the second plurality of electrical loads by operating each of the second plurality of output circuit switches in successive output cycles of the switch mode converter in an order dependent on a forward voltage of each of the second plurality of electrical loads.

An advantage of the circuit comprising first and second sets of electrical loads is that different portions of the converter output, for example a positive and a negative portion, can be used to independently control each set of electrical loads in addition to the control allowed by the output circuit switches controlled by the switching control circuit. The first and second secondary windings are therefore preferably configured to provide outputs to the respective first and second plurality of output circuits over separate portions of each output cycle of the switch mode converter.

Each of the plurality of output circuits may further comprise a modulation switch connected to a respective electrical load, where the switching control circuit is configured to operate the modulation switches according to a pulse width modulation scheme for control of the current through each respective electrical load. Pulse width modulation of each electrical load allows control over the power through the load without requiring a change in the driving current. This is advantageous because, where the electrical load is an LED, a change in the driving current can cause an undesirable change in colour of the output and a change in output efficiency. Pulse width modulation may be applied to all of the electrical loads in the circuit, or may be applied to a subset of one or more of the electrical loads independently.

In the case where pulse width modulation is used, the switching control circuit is preferably configured to sense a current through each of the electrical loads only when the respective modulation switch is closed, thereby avoiding the problem of sensing a zero current when the modulation switch is open and incorrectly adjusting the output circuit switch operation. Each modulation switch may be connected in series with each electrical load, although other arrangements are possible, for example where each electrical load circuit comprises a current mirror and a reference current source connected to the electrical load, the modulation switch being connected to activate the current mirror to control the current through the electrical load.

According to a second aspect of the invention there is provided a method of driving a plurality of electrical loads, the method comprising:

providing a switch mode converter comprising a transformer with primary and secondary windings, the primary winding connected to a voltage supply via one or more input control switches;

providing a plurality of output circuits, each output circuit comprising a switch connecting one of the plurality of electrical loads to an output of the secondary winding, each electrical load connected in series with a respective switch and in parallel with a capacitor; and providing a switching control circuit connected for control of each of the output circuit switches and for sensing of a current through each of the electrical loads, wherein the switching control circuit:

operates the output circuit switches to maintain a set current through each of the electrical loads; and in successive output cycles of the switch mode converter, operates each of the output circuit switches in an order dependent on a forward voltage of each of the respective electrical loads.

One or more of the above mentioned optional and preferable features relating to the first aspect of the invention may correspondingly apply to the second aspect of the invention.

Aspects and embodiments of the invention are described in further detail below by way of example and with reference to the enclosed drawings in which.

Figure 1:
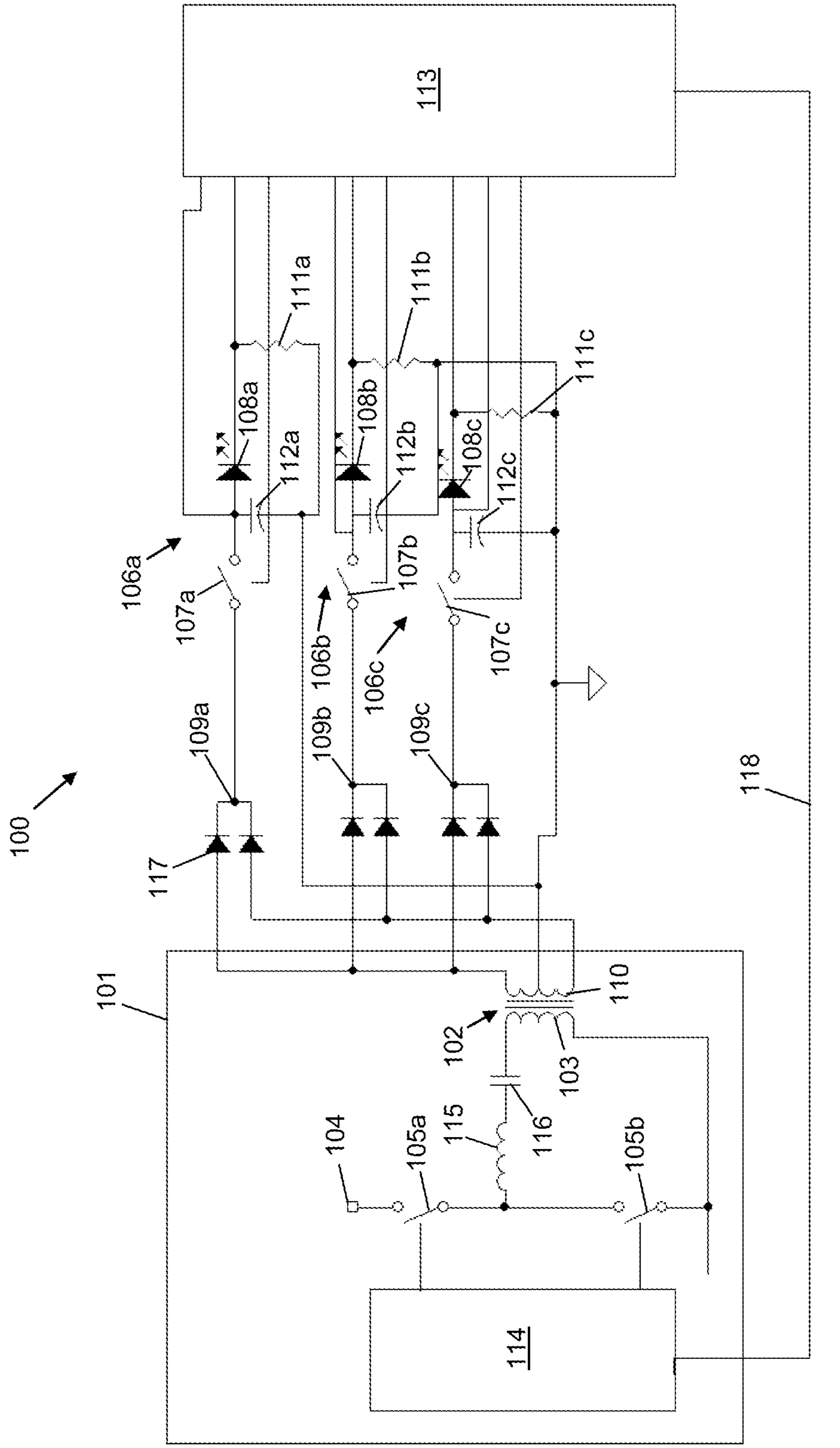
FIG. 1 is a circuit diagram of a first exemplary embodiment of a driving circuit for multiple electrical loads.

Resonant converters are known for delivering power to different kinds of electrical loads, including for use with LEDs. Such converters can generally be designed to be highly efficient, with low levels of electromagnetic interference and, at least for power levels above around 100 W, cost effective. This type of converter is usually designed to behave as a voltage source for an electrical load. A resonant converter can however be considered to be a kind of current-fed half bridge converter. Provided that the output voltage does not change significantly, the output current is largely determined by the current in the resonant tank of the converter. As a result, it is not necessarily detrimental to have the terminal of the output winding of the transformer of such a converter switched between various voltages. During a switch-over the current will be constant, but the rate of change in current over time (dI/dt) will alter due to the change in effective voltage across the resonant inductor. As a result, the resonating current can be diverted to an output that needs to be replenished. In this way each individual output can be provided with the right amount of current (which may be an equal current) even when the output voltages are quite different.

One way of achieving this may be to simply adding a switch, as for example outlined in WO 2006/013500. This approach however has a drawback that there is a restriction when driving LED strings in that the string with the highest forward voltage will need to be connected to the first output. This also leads to relatively high values of RMS currents. These requirements result in the need for binning during production, i.e. categorising and selection of components based on their characteristics, in this case by their forward voltage. This is not a preferable route, as this will substantially add to the cost and complexity of production. A better option would be to allow the electrical loads to be connected randomly, and account for any variation in forward voltages through the design of the driving circuit.

One possibility would be to add further output windings to the resonant converter, which allows for a certain amount of independent control, for example over the positive and negative portions of each switching cycle. However, this approach may not allow for a large number of individual strings to be driven independently. Especially when the various LED strings need tapped windings the construction of the transformer becomes increasingly complicated. With the same complexity of transformer the number of strings driven independently can be doubled by splitting the two halves of the resonant cycle such that the first half cycle will only deliver current to a first set of strings, and the second half of the cycle to deliver current to a second set of strings. This eventually might lead to an unequal loading of the two half cycles, but this can be accounted for by changing the duty cycle of the primary side switches of the resonant converter such that the power delivered to each half matches the required power. A switching controller for such a driving circuit might become rather complicated, although this could be overcome by digital implementation. The switching controller needs to control the individual outputs by proper timing of the secondary switches, by providing the right duty cycle information to accommodate for the difference between the first and second halves of each cycle, and to provide the right frequency information for adjusting the total amount of power to be delivered to the total load.

Additionally it is possible to implement various ways to achieve dimming for each LED string individually, rendering such a system very suitable for applications such as two dimensional (2D) dimming of LED backlight systems for televisions. The following exemplary embodiments are such that all control signals that come from a dimming control unit (embedded in the application) are directly connected to the output controller, located at the secondary side. In this way it is easy to build such a LED driver system with mains isolation, so that the system can be powered directly by a rectified mains voltage (or by the output of a power factor correction circuit).

FIG. 1 illustrates a circuit diagram of a multi-output driving circuit 100 according to a first exemplary embodiment of the invention. The circuit 100 is based on a modification to a multi-resonant LLC half bridge converter. A conventional switch mode converter 101, in this case a block LLC half bridge converter, provides multiple rectified outputs 109*a-c* for driving respective output electrical circuits 106*a-c*. The converter 101 comprises a driving circuit 114 configured to provide switching control signals to a pair of switches 105*a*, 105*b* connected between a voltage supply 104 and ground. In a first half of a cycle, switch 105*a* is closed and switch 105*b* is open, causing current to pass through an inductor 115 on the primary side of the transformer 102 and charge up a primary side capacitor 116. In a second half of a cycle, switch 105*a* is opened and switch 105*b* is closed, causing the current through the primary side winding 103 of the transformer 102 to reverse. The cyclic current is reflected, through a winding ratio, on the secondary side winding 110 of the transformer 102. The output side winding 110 is rectified with diodes 117 to provide rectified outputs 109*a-c* to respective output circuits 106*a-c*. In alternative embodiments, as detailed below in relation to FIGS. 3 and 4, the rectification diodes 117 may not be required.

Each output circuit 106*a-c* comprises an LED electrical load 108*a-c* and a respective output switch 107*a-c* connected in series between the electrical load 108*a-c* and the output 109*a-c*. The output of the switch mode converter 101 behaves as an alternating current generator. By appropriate opening and closing of the switches 107*a-c* over each cycle of the converter 101, this alternating current can be directed to a required output. A phase angle between the conduction times of each switch 107*a-c* and the output voltage of the converter 101 determines how much energy will flow to that output over each cycle. In this way, a controlled amount of energy can be transferred to each output circuit 106*a-c*.

Depending on the actual voltage a current will flow through the LED electrical loads 108*a-c*. The electrical loads 108*a-c* depicted in FIG. 1 are shown as single LEDs, although it should be appreciated that each can represent a plurality of LEDs connected in series. This current through each electrical load 108*a-c* is measured by an output switching control circuit 113, which is configured to operate each of the output control switches 107*a-c*. In the exemplary embodiment shown in FIG. 1, the current measuring means is in the form of a resistor 111*a-c* connected in series with each respective electrical load 108*a-c*. The voltage across each resistor 111*a-c* provides a measure of the current. It should be appreciated however that other current sensing means may alternatively be used, such as by mirroring the current through each load 108*a-c* with a current mirror, or through use of a Hall sensor.

The controller 113 is configured to adjust the on-time of each of the output switches 107*a-c* in such a way as to cause a set amount of current to flow though each electrical load 108*a-c*, depending on the forward voltage of each respective load 108*a-c*. In this way, although the output of the LLC converter 101 will appear like a voltage source, it can nevertheless be used to provide a stabilised current at the right level. When the sensed current through an electrical load 108*a-c* falls, the conduction angle of the associated switch 107*a-c* can be increased to cause the current to rise. Conversely, when the sensed current becomes too high the conduction angle can be decreased to cause the current to fall. Through continual monitoring of the current passing through each of the electrical loads 108*a-c*, the switching control circuit 113 can maintain a set current through each load. The output switching control circuit 113 may be synchronised with the converter switching control circuit 114 by means of a control line 118.

Regarding timing of operation of the switches 107*a-c*, two methods of operation may be possible. According to a first method, the switching sequence involves first closing the switch that connects to the lowest output voltage, then opening that switch and allowing the current to then flow to the next higher voltage. This mode of operation may be considered to be a development of the mode of operation described in WO 2006/013500. In the present case, suppose output 109*c* has the lowest output voltage, and 109*a* the highest output voltage. When all of the switches 107*a-c* are closed, current starts to flow through the output having the lowest voltage (because the rectifying diodes 117 of the other outputs will still block). When the on-time of switch 107*c* that is connected to the lowest output voltage has elapsed that switch is opened. Then the output current will start to flow automatically at the next higher output voltage, which would for example be output 109*b*. When output 109*b* is sufficiently recharged, switch 107*b* is opened, and the remaining part of the current will flow to output 109*a*. The on-time of the switches can be referred to the commutation of the half bridge converter. In this way a simple timer for the on-time of each switch can be built, as for example described in WO2006/013500. However, at switch-off a spike will occur due to parasitic inductances (for example due to pcb tracks or packaging of the switches). This may cause high electromagnetic interference, high losses due to avalanching of the MOSFETs, and ultimately even breakdown. So this mode of operation is not necessarily preferable, but is nevertheless possible and straightforward to implement.

Though the embodiment of FIG. 1 gives a high level of flexibility, it has a drawback of switching noise. Due to parasitic inductances, high over-voltages can also occur across each switch that has just been switched off. This is not preferable for losses and reliability. Note that in the embodiment of FIG. 1 all output lines of the output circuits 106*a-c* are provided as inputs to the controller 113. In some practical embodiments not all of these voltage sense connections might be necessary.

According to a second, improved method, an inductance is added in series with each electrical load, which tends to lengthen the conduction time of each switch, thereby reducing the RMS currents considerably. An exemplary embodiment in which such inductances 201*a-c* are incorporated is illustrated in the circuit diagram of a driving circuit 200 shown in FIG. 2. All other components are similar to those shown in FIG. 1, and corresponding reference signs (not shown) can be assumed to be present.

When an additional inductor is placed between each output 109*a-c* and the respective switch 107*a-c*, the first mode of operation outlined above (switching off when there is still current flowing) will be not possible anymore. Whenever additional inductors are put between the winding/rectifier diode and switch, another sequence must be used. In this sequence, the first switch to close is that connected to the highest output voltage. A switch connected to a lower output voltage is then switched on, causing the current through the first switch to drop, and become zero (as the voltage at the output of the transformer will drop). However, the inductance will cause a finite dI/dt and the switch will automatically be switched off effectively when the current has dropped to zero. In this way the switching losses of the switches will almost completely disappear, resulting in essentially zero current switching, both at switch-on and at switch-off. The implementation of this mode is a less straightforward, as the timing reference of the on-time of the switches is reversed, with the reference for the on-time now the end of the stroke as opposed to the start, but is readily achievable as is evidenced by standard switched mode power supply control ICs.

Figure 2:
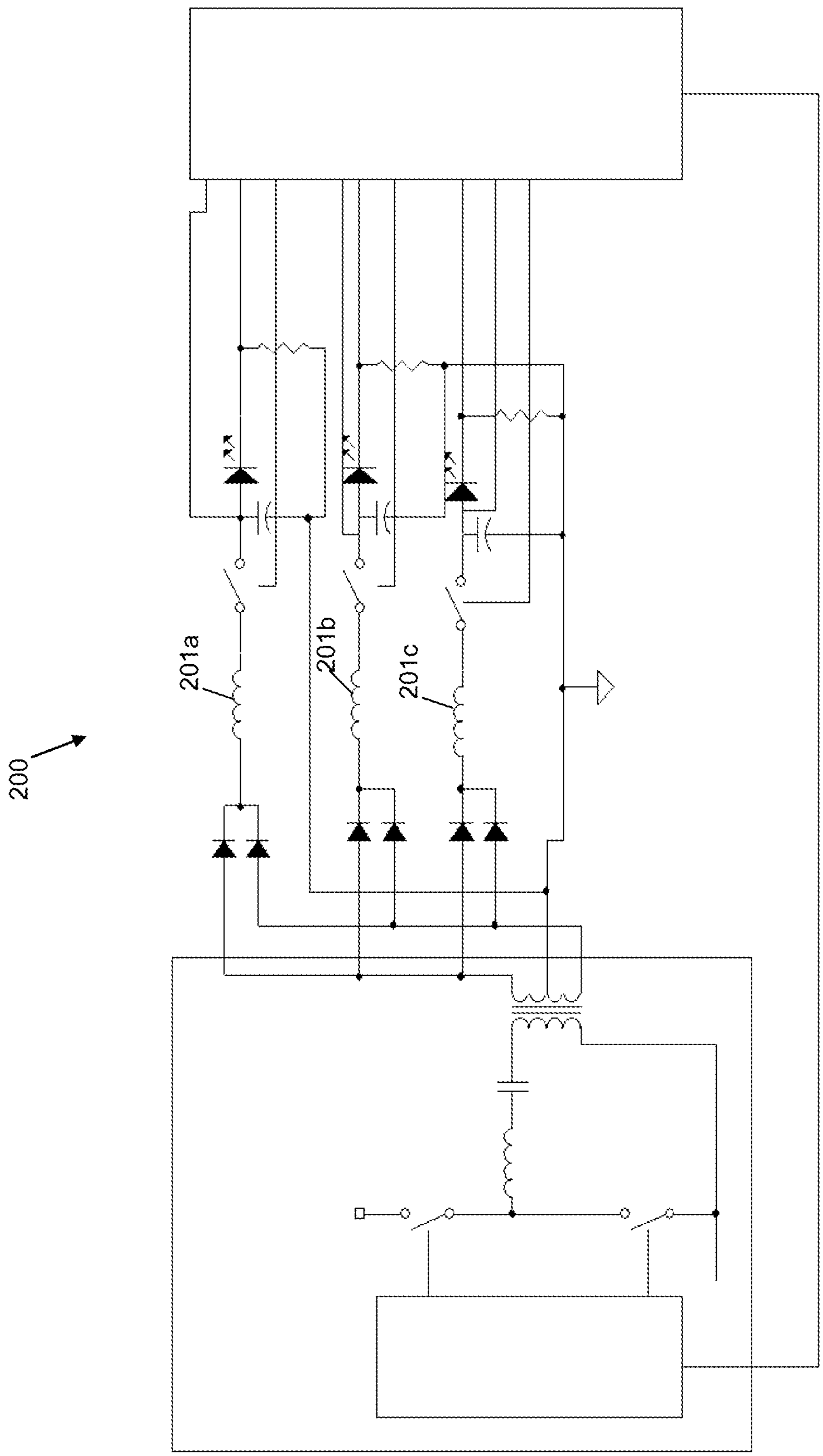
FIG. 2 is a circuit diagram of a second exemplary embodiment of a driving circuit employing additional inductances in each output circuit.

In summary, the embodiment of FIG. 1 without any inductances allows for both of the above described modes of operation, while the embodiment of FIG. 2 with inductances 201*a-c* excludes the first mode that starts with the lowest voltage. The embodiment incorporating inductances is generally preferred, because this not only eliminates virtually all switching losses, but also reduces the RMS-value of the current through each of the individual outputs.

The exemplary embodiments illustrated in FIGS. 1 and 2 restrict the output voltages to be within a predetermined range. In cases where the voltages needed to drive the respective LED strings may be required to differ more substantially, the configuration of the circuit can be changed so that two or more tapped output windings are used, for example to accommodate for the various voltages that may be required when driving different electrical loads. Each output may then be connected to a different winding, and the inductances may be incorporated into the transformer in the form of a leakage inductance.

In cases where the number of different output voltages for correctly driving the LED strings becomes larger, the winding configuration of the transformer may become more complicated since, for each different voltage, two windings are required. This can be addressed by splitting the outputs from the converter into two groups, and have each group powered during only one half of the switching cycle of the resonant converter. This is illustrated by the third exemplary embodiment of a driving circuit 300 shown in FIG. 3. In such an embodiment, an important difference with commonly used resonant converters is that control of the primary side switches 105*a,b* (FIG. 1) can be changed such that the duty cycle of the switches need not to be 50%, but can be higher or lower depending the ratio of power delivered during the upper half and the power delivered during the lower half of each cycle. To describe how to control the various outputs, operation of only the upper half is outlined in the following section, since the lower half can be operated symmetrically.

Figure 3:
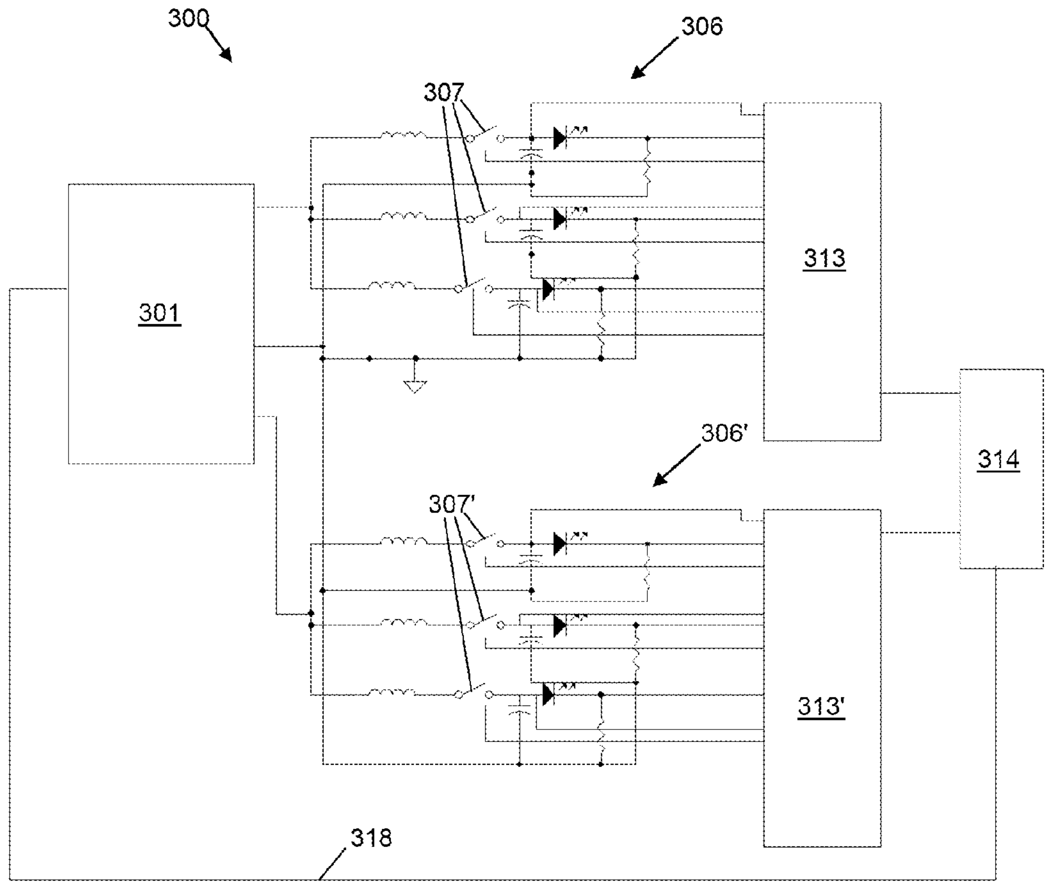
FIG. 3 is a circuit diagram of a third exemplary embodiment of a driving circuit in which the output circuits are divided into two groups.

In the exemplary driving circuit 300 illustrated in FIG. 3, an upper half output circuit 306 and a lower half circuit 306' are connected to a converter 301. Each output circuit 306, 306' is essentially similar to the circuits outlined above in relation to the exemplary embodiment of FIG. 2, except that each output circuit is connected to only one half of the output winding of the converter 301, and receives only one half of each output cycle of the converter 301. The output switching controller is illustrated as separate controllers 313, 313' for each output circuit. In practice, however, a single output switching controller may be used. The output switching controllers 313, 313' are each connected to an common controller 314, which also acts as an LLC converter switching controller. The common controller 314 is connected to control the primary side switching cycle of the converter 301, as with the converter 101 illustrated in FIG. 1 and described above.

The output switching control circuits 313, 313' are configured to control the output switches 307, 307' in such a way that the current can only flow to the output. When the voltage at the output of the LLC converter 301 is less than the respective output voltage, the switches 307, 307' are open (i.e. not conducting). For the upper, or positive, half of the output circuit 306, switches 307 are closed during at least a portion of the time that the input voltage of the upper half of the output circuit 306 is positive. This duration may be varied up to the duration of the upper half of the cycle, depending on the required power level through each of the electrical loads in the output circuit. The on-time of each of the switches 306 is determined by the upper half controller 313. In case any of the respective output circuits is not loaded, a corresponding switch could be held open continuously for as long as the no-load condition is present. No rectification diodes are consequently needed for the embodiment illustrated in FIG. 3 (as well as that in FIG. 4, as detailed below), provided that the switches can block both polarities In the exemplary embodiment of FIG. 3, each half of the driving circuit 300 can be equipped with different windings and/or tapped windings, to accommodate for the various output voltages needed for proper driving of the respective LED strings.

For control of the outputs in each half of the driving circuit 300, only the current information through each electrical load is necessary. Provided the total power delivered to the upper half and to the lower half is equal and the total volt-second product across both secondary windings of the transfer of the LLC converter is the same, this will be sufficient. However, this is in practice unlikely to be the case. Control of the resonant converter 301 may be adjusted to accommodate for this, for example using a dual output control method, as described for example in U.S. Pat. No. 6,721,191 and U.S. Pat. No. 6,822,881. To achieve this, a control parameter is required for the power levels of both output halves of the driving circuit 300, which is implemented by a common controller 314. Therefore the control circuits 313, 313' for the upper half and lower half will be configured to measure the voltage outputs for the output circuits in each half. The power P per half circuit is then simply $$P = \sum_{1, \ldots n} V_i * I_i,$$

with n the number of outputs in that half. Although in the exemplary embodiment of FIG. 3 the same number of outputs is shown for both halves, the number of outputs need not necessarily be the same. The common controller 314 may also be configured to deliver information of the total Volt-second product across the winding, which can be made available by additional connections to the transformer windings directly.

The main function of the common controller 314 is to calculate the appropriate frequency and duty cycle for the primary switches in the converter 301. This information can be transferred to the converter 301 via a control line 318, which may for example be implemented by means of two optocouplers (one for the switching frequency Fsw, the other for the duty cycle δ), or by means of a digital signal control line.

It will be appreciated that the three control circuit blocks 313, 313', 314 illustrated in FIG. 3 for control of the could be integrated into one controller or controller integrated circuit (IC).

Figure 4:
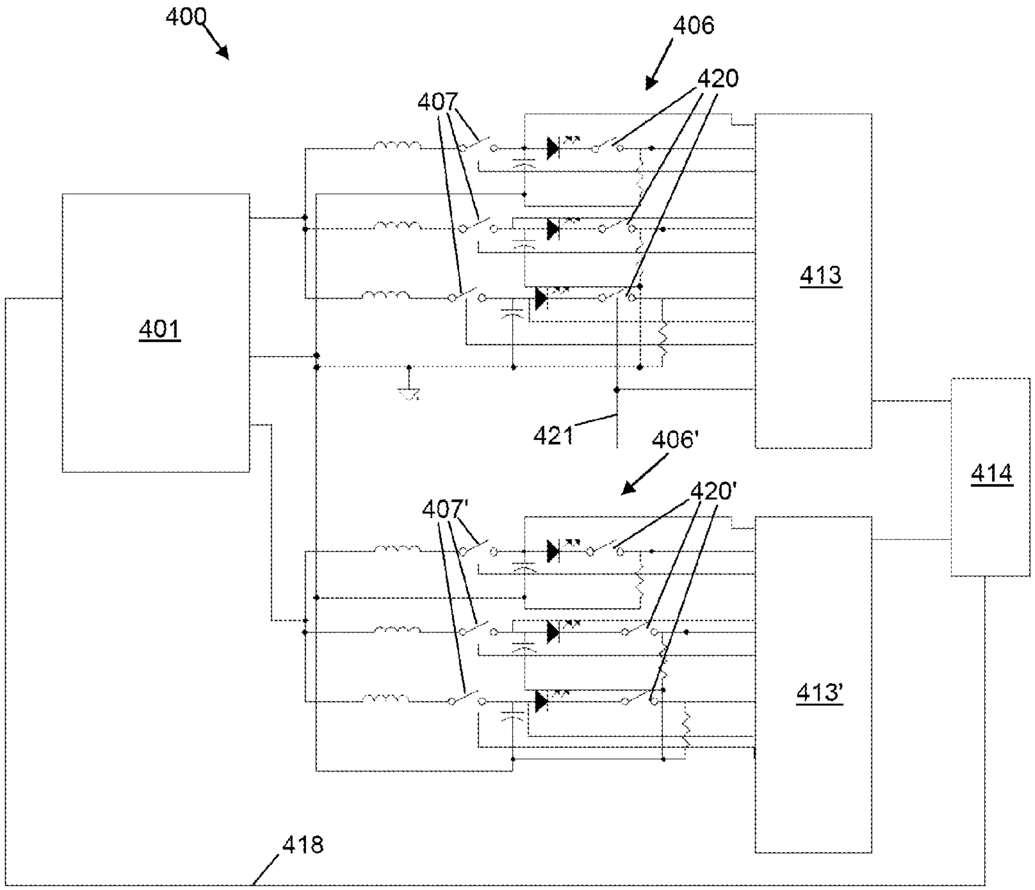
FIG. 4 is a circuit diagram of a fourth exemplary embodiment of a driving circuit incorporating a pulse width modulation dimming capability.

Other embodiments may incorporate means for dimming the electrical loads. Dimming LEDs can be done in an analogue way, for example by lowering the output voltage supplied. Though this can be convenient from a control point of view, it is not generally appropriate for performance, not least because the colour of the light emitted by a LED tends to change with the applied current, which is usually not wanted. A better way of dimming is to add a switch in series with each LED string, and using this switch to apply a modulation to the applied current. This will yield a dimming method without the disadvantage of colour change. The exemplary embodiment illustrated in FIG. 4 shows a driving circuit incorporating switches 420, 420' in series with each electrical load in the output circuits 406, 406'. Each switch is controlled via a control line 421 from the output circuit controllers 413, 413'. A dimming signal, preferably in the form of a pulse width modulation (PWM) signal is applied to each switch, the width of each pulse in the signal being varied according to the light output required. The dimming signal may be applied equally to all of the switches, or may be applied to selected groups of switches independently, for example if a varied modulation scheme is required across different strings of LEDs. The same type of modulation may be applied in the embodiments of FIGS. 1 and 2, and is not necessarily limited to embodiments having multiple groups of output circuits.

As a result of the use of modulation in the output circuits, the controller circuits 413, 413' will need to operate differently when controlling the current being passed through each load. For periods where the modulation switches 420, 420' are open, no current can pass through the associated electrical loads. The controller circuits 413, 413' are therefore configured to sense the current passing through each load only when the associated modulation switch 420, 420' is closed. The controller circuits preferably also function to maintain the voltage across the capacitors connected to each electrical load. This voltage is preferably not permitted to rise considerably, as overcurrent could then occur whenever the modulation switch closes, and should not be allowed to drop considerably, because the current through the LED string will then be too low on closing the modulation switch, causing not only a wrong light output level, but also discoloration. The control circuits 413, 413' are therefore preferably configured to change the input for the controller between current control during the time that the PWM switch is closed, and input voltage control for each electrical load during the off-time of each modulation switch.

As the forward voltages are likely to be significantly different for each LED string, the controller circuits 413, 413' are preferably configured to store the information about the preferred voltage for each string. This information may be pre-stored in the controller circuits 413, 413' during a production calibration step, or may be calculated in use by measuring the voltage across each load at the point where a current is sensed.

Figure 5:
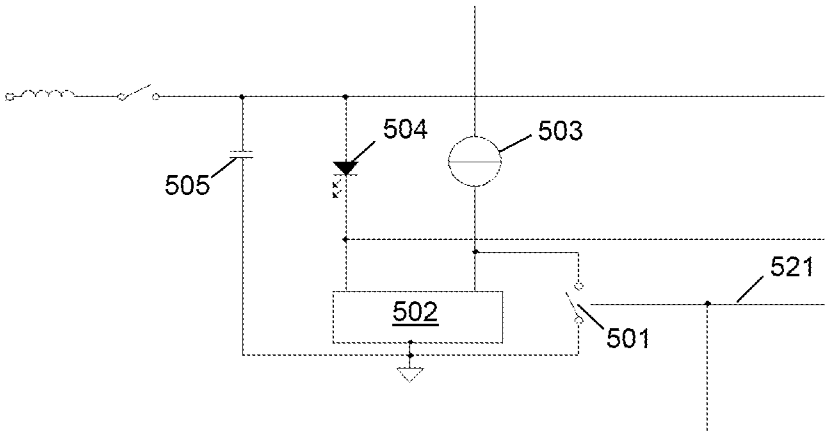
FIG. 5 is a circuit diagram of an exemplary dimming circuit for the fourth embodiment comprising a switchable current mirror.

The circuit diagram in FIG. 5 illustrates an alternative way of providing modulation to the electrical loads of any of the above embodiments. In this, a modulation switch 501 activates a current mirror 502. A reference current $I_{ref}$ provided by a current source 503 controls the current through the LED 504 (which may of course be an LED string) according to the ratio of the current mirror 502. The controller circuits 413, 413' (FIG. 4) provide a modulation signal to the switch 501 via a signal line 521, with the object of minimising the voltage drop across the part of the current mirror 502 connected to the LED 504. An advantage of this arrangement is that, provided that the voltage across the output capacitor 505, is sufficiently high, the current through the LED 504 is always well defined. In alternative embodiments, the modulation switch 501 may be placed in series with the current source 503.

In further alternative embodiments, the set reference current $I_{ref}$ may be modified directly by a dimming control signal, either in an analogue way, via PWM, or by a combination of these. This allows for further flexibility in defining the output of each electrical load.

The number of outputs in a circuit according to the invention may be adapted to suit the application requirements, without any inherent limitations. The number of outputs in the embodiments illustrated herein, i.e. 3 outputs for those in FIGS. 1 and 2 and 6 outputs for FIGS. 3 and 4, should not therefore be taken to be in any way limiting on the scope of the invention. It is also not necessary that the number of outputs is even, nor is it necessary that the number of outputs of the two halves (FIGS. 3 and 4) are equal. It will be appreciated that for each half there can be any number of tapped windings, and that also this can be different for each half.

The controller or controllers used for operation of the driving circuits may be analogue in nature, although are preferably in the form of digital controllers implemented for example as micro controllers or by a dedicated controller.

It will also be appreciated that many of the components, like sensing resistors, output switches and PWM switches, current mirrors and reference current sources can be integrated in the controller circuit, and an integrated circuit may be provided to perform all of these functions.

Applications of the invention include LED backlights for television applications, including backlights having multiple colours with individually dimmable colours. Embodiments of the invention may also be used for LED arrays for general lighting applications.

Other embodiments are intentionally within the scope of the invention as defined by the appended claims.

The invention claimed is:

1. A circuit for driving a plurality of electrical loads, comprising:

a switch mode converter comprising a transformer with primary and secondary windings, the primary winding connected to a voltage supply via at least one input control switch;

a plurality of output circuits, each output circuit comprising an electrical load connected to an output of the secondary winding by a respective output circuit switch and connected in parallel with a capacitor; and a switching control circuit connected for control of each of the output circuit switches and for sensing of a current through each of the electrical loads, wherein the switching control circuit is configured to operate the output circuit switches to maintain a set current through each of the electrical loads, the switching control circuit configured in successive output cycles of the switch mode converter to operate each of the output circuit switches in an order dependent on a forward voltage of each of the respective electrical loads.

2. The circuit of claim 1 wherein the switching control circuit is configured to operate a first one of the switches connected to a first one of the electrical loads having a highest forward voltage before a second one of the switches connected to a second one of the electrical loads having a next highest forward voltage.

3. The circuit of claim 2 wherein the switching control circuit is configured to operate a third and any subsequent ones of the switches connected to a third and any subsequent ones of the electrical loads having successively lower forward voltages in successive order after operation of the second one of the switches.

4. The circuit of claim 1 wherein each electrical load comprises at least one light emitting diode.

5. The circuit of claim 4 wherein each electrical load comprises a plurality of series-connected light emitting diodes.

6. The circuit of claim 1 wherein each switch is connected to a respective output of the secondary winding by an inductor.

7. The circuit of claim 1, wherein each electrical load is connected in series with a current sensing resistor, the switching control circuit being configured to measure a voltage across each current sensing resistor to determine a current through each respective electrical load.

8. The circuit of claim 1 wherein the switching control circuit is configured to determine the order of forward voltages of each of the respective electrical loads by measuring the current through each electrical load after closing the switches.

9. The circuit of claim 1, wherein the switching control circuit is configured to store the order of forward voltages of each of the respective electrical loads.

10. The circuit of claim 1 wherein the plurality of output circuits is a first plurality of output circuits and the secondary winding is a first secondary winding, the circuit further comprising a second plurality of output circuits each comprising a switch connecting a further electrical load to an output of a second secondary winding of the transformer, each of the further electrical loads being connected in series with a respective switch and in parallel with a capacitor, the switching control circuit being further connected for control of each of the second plurality of output circuit switches and for sensing of a current through each of the further electrical loads, wherein the switching control circuit is configured to operate the second plurality of output circuit switches to maintain a set current through each of the further electrical loads to operate each of the second plurality of output circuit switches in successive output cycles of the switch mode converter in an order dependent on a forward voltage of each of the further electrical loads.

11. The circuit of claim 10 wherein the first and second secondary windings are configured to provide outputs to the respective first and second plurality of output circuits over separate portions of each output cycle of the switch mode converter.

12. The circuit of claim 1 wherein each of the plurality of output circuits comprises a modulation switch connected to a respective electrical load, the switching control circuit being configured to operate the modulation switches according to a pulse width modulation scheme for control of the current through each respective electrical load.

13. The circuit of claim 12 wherein the switching control circuit is configured to sense current through each of the electrical loads only when a respective modulation switch is closed.

14. The circuit of claim 12 wherein each output circuit comprises a current mirror and a reference current source connected to the electrical load, the modulation switch connected to activate the current mirror to control current through the electrical load.

15. A method of driving a plurality of electrical loads, the method comprising:

providing a switch mode converter comprising a transformer with primary and secondary windings, the primary winding connected to a voltage supply via at least one input control switch;

providing a plurality of output circuits, each output circuit comprising a switch connecting one of the plurality of electrical loads to an output of the secondary winding, each electrical load connected in series with a respective switch and in parallel with a capacitor; and providing a switching control circuit connected for control of each of the output circuit switches and for sensing of a current through each of the electrical loads, wherein the switching control circuit:

operates the output circuit switches to maintain a set current through each of the electrical loads; and in successive output cycles of the switch mode converter, operates each of the output circuit switches in an order dependent on a forward voltage of each of the respective electrical loads.

* * * * *